United States Patent [19]
Milling

[11] 3,778,032
[45] Dec. 11, 1973

[54] CANDY MIXER
[75] Inventor: Thomas E. Milling, Lake Zurich, Ill.
[73] Assignee: The Quaker Oats Company, Chicago, Ill.
[22] Filed: Mar. 1, 1972
[21] Appl. No.: 230,842

[52] U.S. Cl. .................................................. 259/6
[51] Int. Cl. .............................................. B01f 7/04
[58] Field of Search .................. 259/6, 21, 41, 64, 259/104, 161

[56] References Cited
UNITED STATES PATENTS
| | | | |
|---|---|---|---|
| 3,451,659 | 6/1969 | Tobolov et al. | 259/161 |
| 2,726,852 | 12/1955 | Sommer | 259/6 X |
| 2,028,745 | 1/1936 | Hendrick et al. | 259/157 X |

FOREIGN PATENTS OR APPLICATIONS
939,759 4/1948 France .................. 259/41

Primary Examiner—Billy J. Wilhite
Assistant Examiner—Alan I. Cantor
Attorney—Donnie Rudd et al.

[57] ABSTRACT

An apparatus is disclosed for mixing and conditioning aerated chocolate, aerated fat, and cereal particles in the manufacture of candy, the apparatus comprising an elongated trough open at the top and opened at one end of the bottom and having a plurality of rotatable intermeshing tines located within the trough, and wherein a material is placed at the top of one end of the elongated trough and then passes through the rotating tines and out the bottom of the other end onto the conveyor.

4 Claims, 4 Drawing Figures

PATENTED DEC 11 1973 3,778,032

CANDY MIXER

BACKGROUND OF THE INVENTION

Field of the Invention:

This invention relates to an apparatus for mixing and conditioning chocolate, fat and cereal particles in the manufacture of candy.

DESCRIPTION OF THE PRIOR ART

The manufacture of candy bar centers requires a mixing apparatus which can blend and mix materials such as chocolate, fat, and cereal, such as puffed or crisped rice. Heretofore, most of this mixing has been accomplished in a batch mixer with the final mixed product then being cast into shaped bars to be used as candy bar centers. I have provided a new mixing apparatus which will mix these ingredients in a continuous manner and cast them continuously in a sheet which can readily be compacted and subdivided to form candy bar centers.

SUMMARY OF THE INVENTION

It is an object of this invention to provide an apparatus for the continuous mixing and conditioning of aerated chocolate, aerated fat, and cereal particles in the manufacture of candy.

It is a further object of this invention to provide a mixer for mixing candy bar centers with a mixing action gentle enough to avoid excessive cereal attrition.

It is another object of this invention to provide a mixer for mixing fat into candy bar centers wherein the mixing action is gentle enough to avoid deaerating the fat portion.

It is still another object of this invention to provide an apparatus for mixing candy bar centers that are substantially lump free.

The objects of this invention are accomplished by an apparatus for mixing and conditioning aerated chocolate, aerated fat, and cereal particles in the manufacture of candy, said apparatus comprising an elongated trough having a feed end and discharge end, said feed end of said elongated trough being substantially open at the top thereof and said discharge end of said elongated trough having an opening at the bottom thereof; means for uniformly supplying mixable material to the feed end of the elongated trough; a plurality of rotatable intermeshing tines having horizontal axes, said plurality of rotatable intermeshing tines being located between the feed end and the discharge end of the elongated trough, and said rotatable intermeshing tines being disposed such that the outer portion of the tines nearly touch the bottom of the elongated trough upon rotation; means for rotating the rotatable intermeshing tines in timed relationship one with the other; means for substantially preventing stagnation of material as it moves from the feed end of the elongated trough to the discharge end thereof; and means for conveying mixed material away from the discharge end of the elongated trough, said means being set at a predetermined distance below the dischage end of the trough.

Preferably, the apparatus of this invention is one wherein the elongated trough is curved at least one end to match the radius of the rotatable tines.

Also preferably, the apparatus includes means for cooling or heating the mixed material as it is mixed.

In operation of the mixer of this invention, the ingredients such as chocolate, fat and cereal particles, are inserted in the top of one end of the mixer and progress through the mixer being agitated and being mixed by the rotatable tines until the mixed ingredients are disposed at the bottom of the other end of the mixer onto a conveyor.

BRIEF DESCRIPTION OF THE DRAWING

My invention may be more fully described, but is not limited, by the attached drawing wherein.

Figure 1:
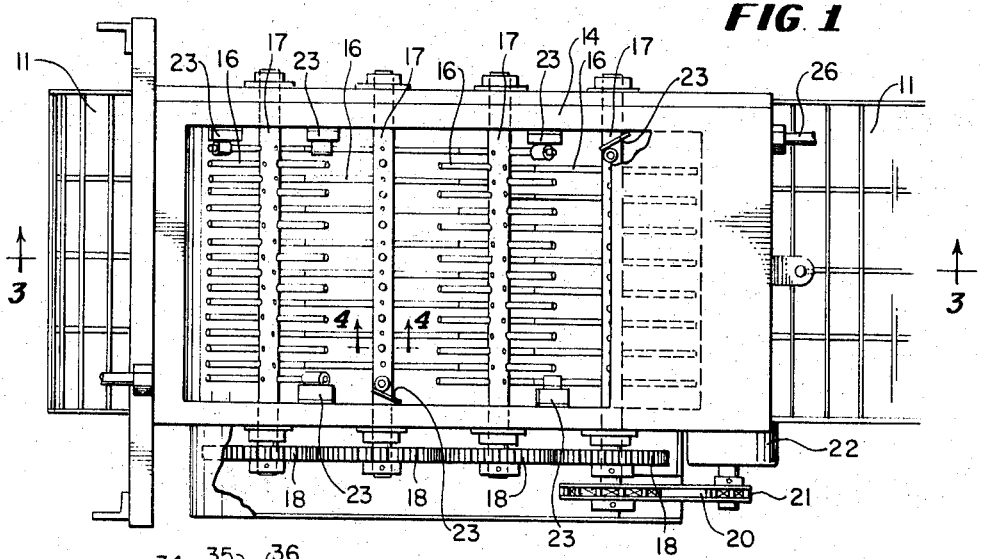
FIG. 1 illustrates a top view of the invention.
Figure 2:
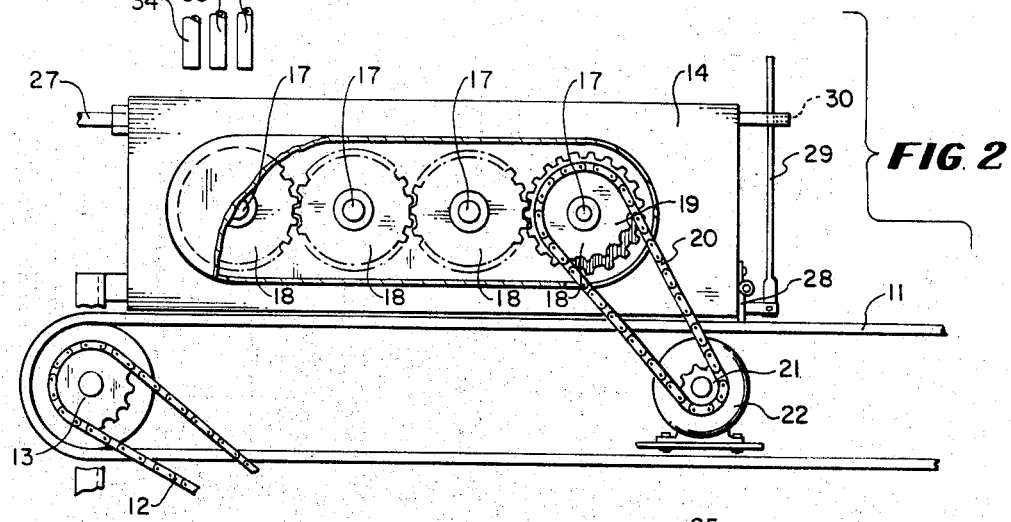
FIG. 2 illustrates a side view of the invention partially cut away to show the means for rotating the tines.
Figure 3:
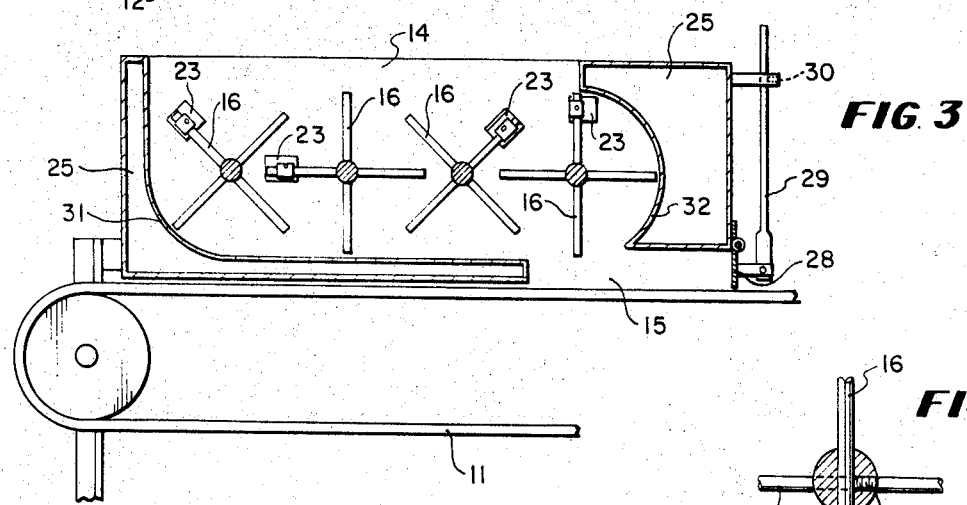
FIG. 3 is a sectional view taken along the line 3—3 of FIG. 1.
Figure 4:
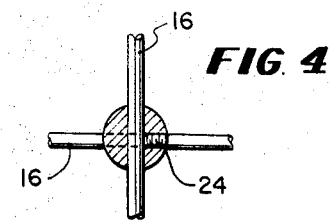
FIG. 4 is a sectional view taken along the line 4—4 of FIG. 1.

In the drawings, I have used the numeral 11 to refer to a continuous endless conveyor driven by chain 12 passing over sprocket 13. Sitting above the conveyor is an elongated trough 14 substantially open at the top and having an opening at one end of the bottom thereof as indicated by numeral 15. In the trough is a plurality of rotatable intermeshing tines 16 having horizontal shafts 17 which are connected to intermeshing gears 18, one of which is in turn rotated by sprocket 19 which is attached to chain 20 and the sprocket 21 on motor 22. The end tines are alternately provided with scrapers 23 to prevent stagnation of material on the sides of the mixer. The rotating tines are placed on the shaft perpendicular to one another and secured by set screws 24 such as shown in FIG. 4. The tines nearly touch the bottom and sides of the elongated trough to prevent stagnation of material therein. The mixing chamber preferably has a cooling or heating chamber 25 provided with an inlet 26 for introducing a cooling or heating medium, depending on the temperature and conditions required, and an outlet 27 for removing the cooling or heating medium. Also preferably, the distance between the endless conveyor and the bottom of the elongated trough, is adjusted by outlet adjustment which consists of flap 28 movably connected to adjustment rod 29 which may or may not have a set screw 30 to adjust the distance. Also preferably, at least one end of the elongated trough is curved such as curve 31 or curve 32 to match the radius of the rotatable tines. This invention also includes means for uniformly supplying mixable materials to the elongated trough such as supply pipes 34, 35, and 36.

DESCRIPTION OF THE PREFERRED EMBODIMENTS

The attached drawings and above description illustrate the preferred embodiment of the invention.

Having fully described this new and unique apparatus for mixing and conditioning chocolate, fat, and cereal particles in the manufacture of candy, I claim:

1. An apparatus for mixing and conditioning chocolate, fat, and cereal particles in the manufacture of candy, said apparatus comprising an elongated trough having a feed end and a discharge end, said feed end of said elongated trough being substantially open at the top thereof and said discharge end of said elongated trough having an opening at the bottom thereof; means for uniformly supplying mixable material to the feed end of the elongated trough; a plurality of rotatable intermeshing tines having horizontal axes of rotation, said axes of rotation being substantially perpendicular to a line drawn from the feed end to the discharge end, said plurality of rotatable intermeshing tines being located between the feed end and the discharge end of the elongated trough, said rotatable intermeshing tines being disposed such that the outer portion of the tines nearly touch the bottom of the elongated trough upon rotation; means for rotating the rotatable intermeshing tines in timed relationship one with the other; means for substantially preventing stagnation of material as it moves from the feed end of the elongated trough to the discharge end thereof; and means for conveying mixed material away from the discharge end of the elongated trough, said means being set at a predetermined distance below the discharge end of the trough.

2. An apparatus as in claim 1 wherein the elongated trough is curved at at least one end to match the radius of the rotatable tines.

3. An apparatus as in claim 1 including means for cooling or heating material as it is mixed.

4. An apparatus as in claim 1 wherein the means for substantially preventing stagnation of material as it moves from the feed end of the elongated trough to the discharge end thereof comprises scrapers connected on the end tines.

* * * * *